March 28, 1939. J. W. MYERS 2,152,560
COOKING APPARATUS
Filed Nov. 13, 1937 3 Sheets-Sheet 1

Inventor:—
Joseph W. Myers
by his Attorneys
Howson & Howson

March 28, 1939.  J. W. MYERS  2,152,560
COOKING APPARATUS
Filed Nov. 13, 1937    3 Sheets-Sheet 2
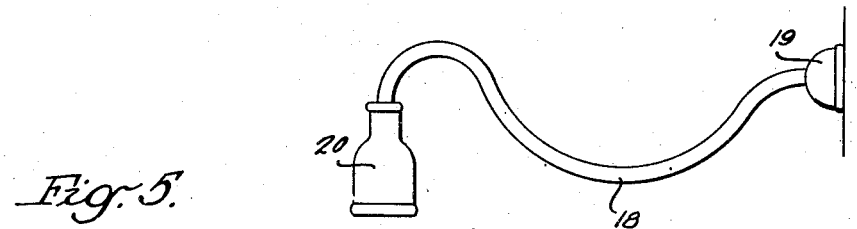
Fig. 5.
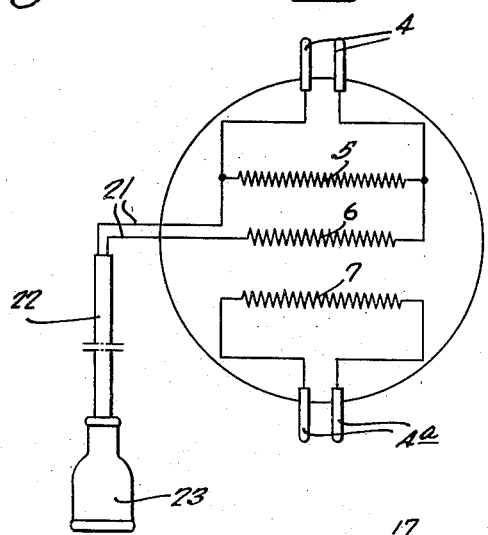
Fig. 4.
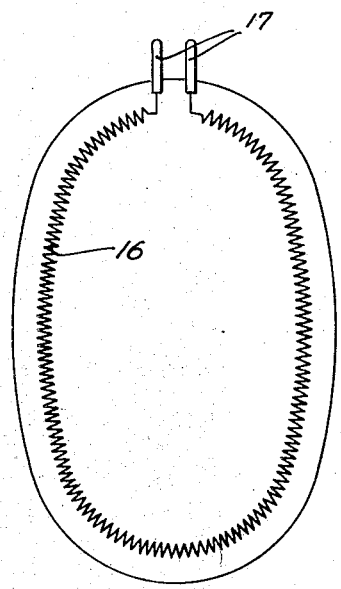
Inventor
Joseph W. Myers
by his Attorneys
Howson & Howson March 28, 1939.   J. W. MYERS   2,152,560
COOKING APPARATUS
Filed Nov. 13, 1937   3 Sheets-Sheet 3
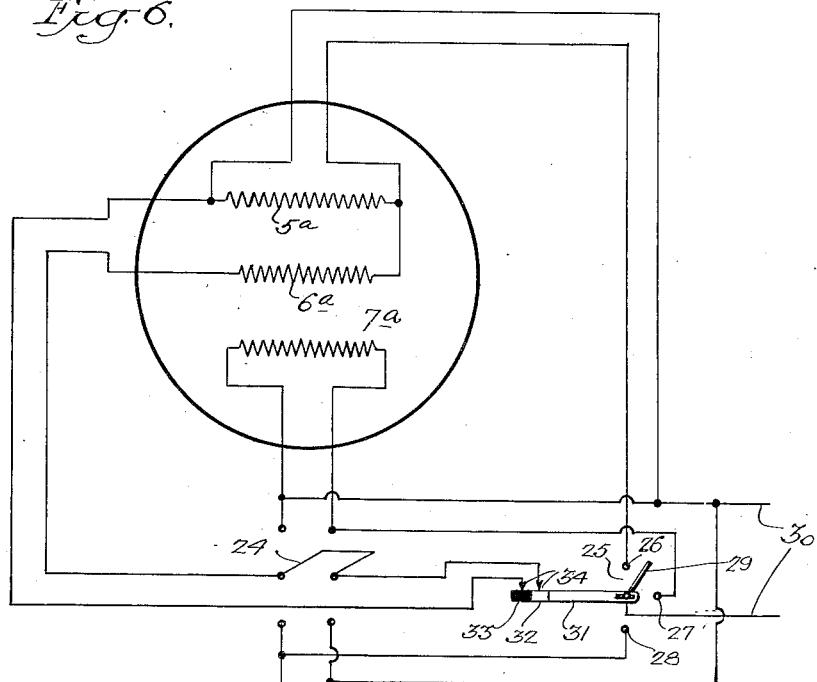
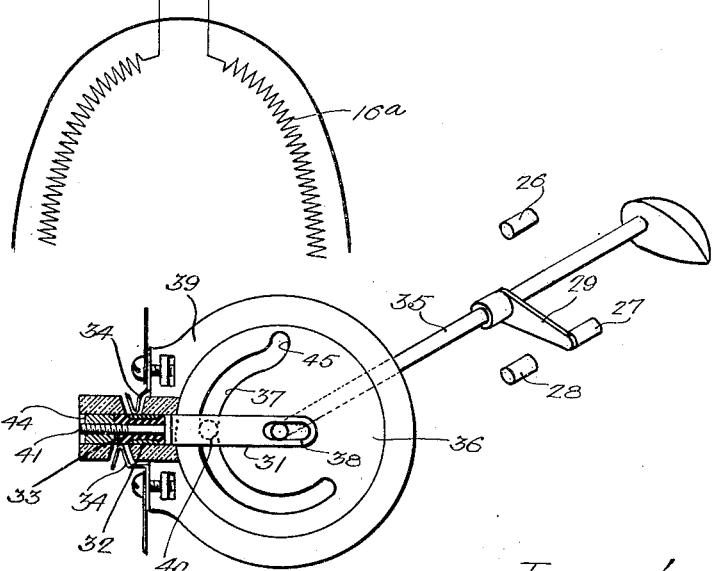

Patented Mar. 28, 1939

2,152,560

UNITED STATES PATENT OFFICE 2,152,560

COOKING APPARATUS

Joseph W. Myers, Philadelphia, Pa., assignor to Proctor & Schwartz, Incorporated, Philadelphia, Pa., a corporation of Pennsylvania Application November 13, 1937, Serial No. 174,460

5 Claims. (Cl. 219—20)

This invention relates to a novel electrical hot plate cooking device and to the combination thereof with an electric roaster or like device.

The electric roaster is now being used to a considerable extent and is becoming increasingly popular due to the fact that this device, more nearly than any other household appliance employed thus far, provides satisfactory electric cooking facilities without resorting to special wiring, as required by the modern electric range. While the electric roaster is capable of performing a variety of cooking operations, there are certain cooking operations which may be performed more efficiently on an electric hot plate device rather than within the well or cooking chamber of an electric roaster. It is frequently desired to employ an electric hot plate device simultaneously with the operation of an electric roaster; for example, it may be desired to employ the hot plate device to cook a separate dish, to make a cream sauce or the like, or even to heat water, at the same time that the electric roaster is performing the major cooking operations. It has heretofore been impossible, however, to energize both an electric roaster and a hot plate cooking device from the same electric outlet and this has retarded materially the use of the electric roaster.

To explain this more fully, it is customary to limit the output of a conventional electric outlet and its feeder circuit to 1650 watts and, in some instances, the output is limited to 1320 watts. The electric roaster is ordinarily operated from a conventional electric outlet and, since the power consumption of such a device is usually 1320 watts or more, it is obviously unsafe to attempt to operate any other electric appliance from the same electric outlet. Moreover, in view of the various modern electric appliances, such as refrigerators, electric clocks, electric mixers, etc., it is usually inconvenient, if not impossible, to devote more than one electric outlet to the cooking of foods. Therefore, when it is desired to employ a hot plate device simultaneously with the operation of an electric roaster, as above mentioned, it is usually necessary to operate such device from an electric outlet in some other room or to discontinue the use of the roaster while the hot plate is being employed.

The principal object of the present invention is to provide a novel hot plate device which may be employed in conjunction with an electric roaster and may be energized simultaneously from the same electric outlet, and which is capable of use by itself in various manners to obtain different heating effects. The device provided by the invention fulfills the urgent need for some means by which a hot plate device may be operated simultaneously with an electric roaster from the same electric outlet. Thus, the invention removes the serious handicap to which the electric roaster has been subject and enables the use of the electric roaster by persons who have heretofore been unable to use this appliance due to the above considerations.

Another object of the invention is to provide a novel cooking apparatus comprising an electric hot plate and an electric roaster interconnected by a novel switching system to fulfill the purposes of the invention, as described more fully hereinafter.

The invention may be more fully understood by reference to the accompanying drawings, in which Fig. 1 is a face view of the heating plate of the novel hot plate device provided by the invention;

Fig. 4 is a simple illustration of the electrical heating circuit of the electric roaster;

Fig. 5 is a diagrammatic illustration of the electrical circuits of the hot plate device, by means of which illustration the functioning of the device may be readily understood;

Fig. 6 is a diagrammatic illustration of a modified form of the invention; and

Fig. 7 illustrates the interlocking switch device employed in Fig. 6.

Figure 1:
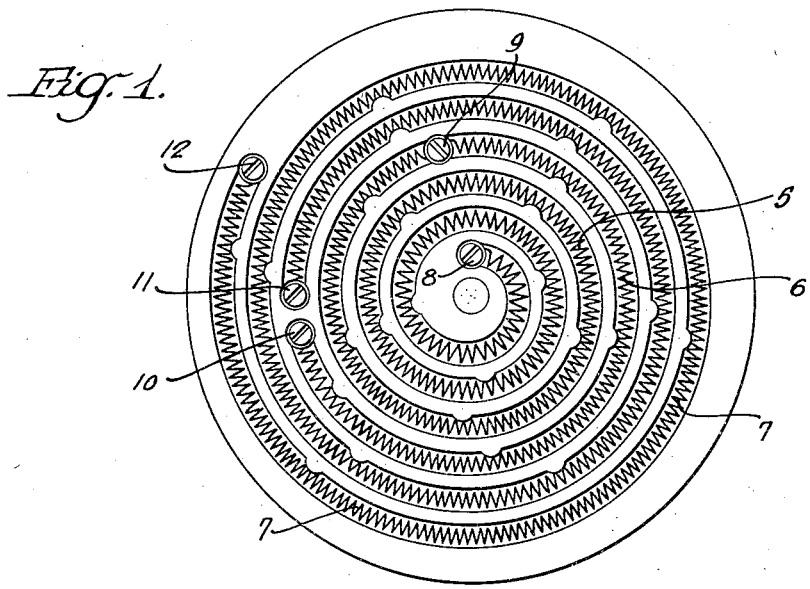
Figure 2:
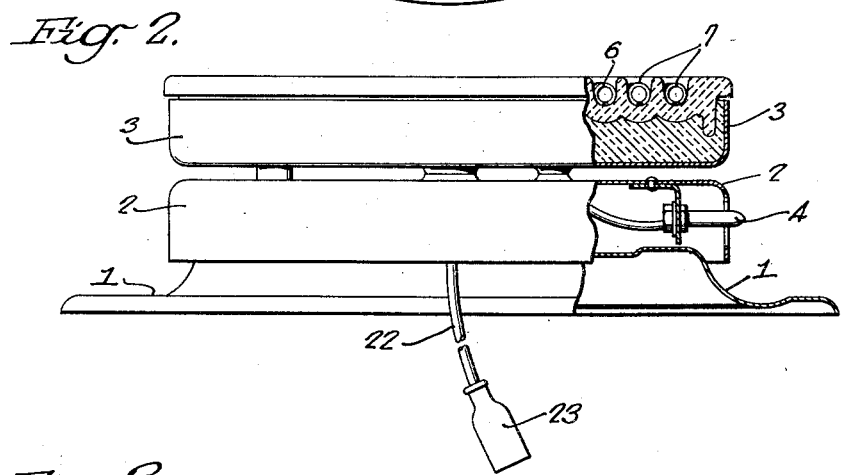
Fig. 2 is an elevational view of the device with a portion thereof shown in section.

Referring first to Figs. 1 and 2, the hot plate structure comprises a supporting base 1 on which there is mounted a support 2 for the heating plate 3. The heating units described hereinafter are energizable by means of conventional terminal prongs such as shown at 4 in Fig. 2 which are adapted to receive the usual connector plug on the end of an electric cord for connecting the appliance to the usual electric outlet. The heating plate 3 is preferably circular and the heating elements of the device are preferably arranged in spirals as shown in Fig. 1. In accordance with the present invention, there are provided three heating elements designated respectively 5, 6 and 7. In the specific device illustrated, the heating element 5 is in the form of an inner spiral extending from the terminal screw 8 to the terminal screw 9. The heating element 6 extends from the screw 9 to the terminal screw 10. The heating element 7 is independent of the other two elements, as will be more fully understood later, and extends from a terminal screw 11 to the terminal screw 12.

Figure 3:
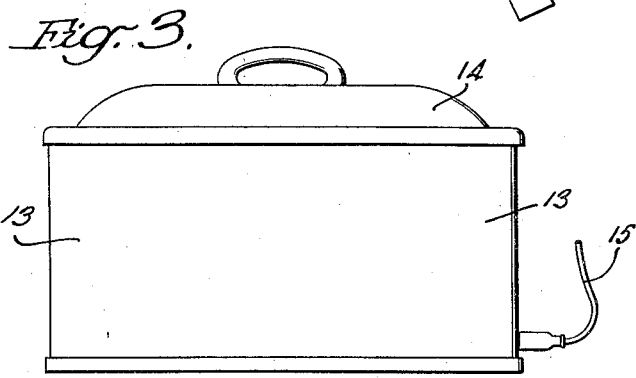
Fig. 3 is an elevational view of a modern electric roaster with which the hot plate device may be employed.

As stated above, the hot plate device provided by the invention is adapted for use in conjunction with an electric roaster of the type shown in Fig. 3. This roaster comprises a vessel or receptacle 13, the walls and bottom of which are preferably heat insulated and a removable lid or cover 14. The heating unit or units on the vessel 13 are disposed within the bottom and wall of the vessel, as is customary in the modern electric roasters which are now sold commercially. Electrical connection is made to the roaster by means of the usual cord and plug as fragmentarily indicated at 15. In Fig. 4, the principal heating circuit of the electric roaster is illustrated schematically and is shown as comprising an electrical heating unit 16 connected to terminal prongs 17 which are adapted to receive a plug as shown in Fig. 3. As previously stated, the electrical heating unit or units of such an electric roaster normally consumes 1320 watts or more so that the electrical consumption of the device approaches the output limit of the conventional electric outlet and its feeder circuit, which limit is usually 1650 watts.

The electrical heating units or elements of the hot plate device provided by this invention are designed in predetermined relation to one another and to the heating unit of the electric roaster as will be explained presently. As shown in Fig. 5, the electrical heating element 5 is connected to a set of terminal prongs 4, while the heating element 7 is connected to a separate set of terminal prongs 4a. It will be seen, therefore, that the heating elements 5 and 7 are separately energizable by means of an electric cord such as shown at 18, one end of which carries a plug 19 inserted in a conventional wall outlet, while the other end of the cord carries a heater plug 20 which may be engaged with either of the sets of prongs 4 and 4a.

The heating element 6 is connected serially in one of the conductors 21 which are connected respectively to the terminals of the heating element 5 or, in other words, connected respectively to the terminal prongs 4. It will be seen that the heating element 5 is in shunt or parallel relation with respect to the conductors 21, one of which includes the resistance element 6. The conductors 21 extend externally of the hot plate device through a flexible conductor cord 22 carrying at its end a plug receptacle 23 which is adapted to engage either the terminal prongs 4a or the terminal prongs 17.

Assuming that the plug receptacle 20 is attached to the prongs 4, thereby energizing the heating element 5, if the plug receptacle 23 is then connected to the prongs 17 on the roaster, the resistance element 6 is inserted in series with the heating element 16 of the roaster and serves to reduce the energy consumption of the roaster, as will be more fully discussed hereinafter. It will be apparent that the heating elements 5, 6 and 16 will be energized simultaneously. Suppose, however, that the plug 23 is attached to the prongs 4a on the hot plate device. The resistance element 6 will then be inserted in series relation with the heating element 7 and will serve to reduce the energy consumption of the element 7. In such case, all three of the heating elements of the cooking plate device will be energized.

When the plug 23 is not connected to either of the aforesaid sets of prongs, however, only the heating element 5 will be energized since the circuit of the heating element 6 is not completed.

In a specific example, the heating element 5 may have a resistance of about 33 ohms so as to normally consume about 400 watts of electrical energy, while the heating element 7 may have a resistance of about 10 ohms so as to consume about 1320 watts or, in other words, substantially the same amount of energy as is normally consumed by the roaster. The heating element 6 may have a resistance of about 2 ohms so that it consumes approximately 184 watts of electrical energy when connected as above described. Under such circumstances, when the heating element 6 is connected to the roaster, the energy consumption of the roaster is reduced to approximately 916 watts, which is quite adequate for all cooking operations once they have been started. At the same time, the hot plate device is simultaneously energized and the combined energy consumption of the heating elements 5 and 6 is approximately 584 watts. It will be seen, therefore, that the total energy consumed by the hot plate device and the roaster, when thus energized simultaneously, is approximately 1500 watts which is within the output limit of the ordinary electric outlet. When the roaster and the hot plate device are thus used in combination, there is sufficient heat energy generated in the roaster to efficiently carry on all cooking operations and, at the same time, there is sufficient heat energy generated by the hot plate to permit such operations as may be desired, as above mentioned.

When the plug 23 is connected to the terminal prongs 4a so that the hot plate device alone is energized, the energy consumption of the hot plate is approximately 1500 watts. In this instance, the heating element 6 will reduce the energy consumption of the heating element 7 from 1320 watts to approximately 916 watts. This lowered energy consumption of the heating element 7 plus the combined energy consumption of the heating elements 5 and 6 (584 watts) is equal to approximately 1500 watts.

It will be noted, therefore, that the hot plate device may be connected in three different ways so that it consumes different amounts of electrical energy and gives different heating effects. When the heating element 5 alone is energized, the hot plate device consumes 400 watts of electrical energy. When the heating element 7 alone is energized, the device consumes 1320 watts of electrical energy. When all three of the heating elements of the device are energized by attaching the plug receptacle 23 to the prongs 4a, the device consumes 1500 watts of electrical energy as above pointed out. It will be seen, therefore, that the device is flexible in operation and may be used to perform various cooking operations requiring different amounts of heat.

In Fig. 6, there is illustrated a modified form of the invention in which the hot plate and the roaster are electrically interconnected by a novel switching system to adapt the apparatus for the purposes of the invention. While the two devices are indicated in Fig. 6 as being physically separate, they may be embodied in a single structure which may also include the switching devices now to be described. The invention, therefore, contemplates having the devices separate or having a single apparatus embodying the devices, employing switching devices to adapt the apparatus for operation of the hot plate and roaster selectively or in novel combination, as above described.

Referring to Fig. 6, there is provided a double-pole, double-throw switch 24 which is adapted to connect the circuit of the resistance element 6a either to the heating unit 7a or to the roaster unit 16a, as will be clearly understood from the above description. The effectiveness of the switch 24 is determined, however, by the position of the selector switch 25 by means of which any one of the heating units 5a, 7a and 16a may be selectively energized. The switch 25 is illustrated as comprising stationary contacts 26, 27 and 28 which are selectively engageable by a rotatable contact arm 29. When the arm 29 engages contact 26, the supply lines 30 are connected through the switch arm to the heating unit 5a to energize the same. When the arm 29 is in engagement with the contact 27, the heating unit 7a is energized. When the arm 29 engages contact 28, the roaster unit 16a is energized.

As will be described in further detail with reference to Fig. 7, the movement of the switch arm 29 controls the position of a slidable contact bar 31 which has a conductice segment 32 and an adjacent insulating segment 33. For all positions of the arm 29 other than the uppermost position in which it engages contact 26, the contact bar 31 is in the position shown and the circuit of the resistance element 6a is opened at the spring contacts 34 which engage the bar 31. This renders the switch 24 ineffective for all positions of the switch arm 29 other than the uppermost position of the switch arm in which it engages contact 26. In that position of the switch arm 29, the contact bar 31 is moved toward the left, as viewed in Fig. 6, to bring both the contacts 34 onto the conductive segment 32, thus rendering the switch 24 effective.

Suppose, for example, that the switch arm 29 is moved into engagement with contact 26 to energize the heating unit 5a. This will cause the contact segment 32 to bridge the contacts 34 as just explained. Suppose now that it is desired to connect the resistance element 6a to either the heating unit 7a or to the roaster unit 16a. This may be done by operating the switch 24 which has been rendered effective by the interlocking switch 32, 34.

Suppose now that the switch arm 29 is moved into engagement with the contact 27 causing the contact bar 31 to move to the position shown, thus opening the electrical connection between the contacts 34. At this time, the heating unit 7a will be energized and the switch 24 will be ineffective. Obviously, throwing the switch 24 to either of its positions will have no effect, due to the open circuit at contacts 34.

When the switch arm 29 is moved to its lower position into engagement with contact 28 to thus energize the roaster unit 16a, the contact bar 31 remains in the position shown and the switch 24 is maintained ineffective.

It will be seen, therefore, that there is provided an electrical interlock between the switches 24 and 25 to render the switch 24 effective only when the switch 25 is in a position to energize the heating unit 5a. A simple form of device which may be employed for this purpose is illustrated in Fig. 7. In this device, the switch arm 29, which is shown in engagement with the contact 27, is mounted on a rotatable shaft 35 which also carries a disk 36 having a cam slot 37. The contact bar 31 is slotted at one end, as shown at 38, to receive the shaft 35, while the other end of the bar is slidably supported by the insulating housing or support 39 which supports the contact fingers 34. The bar 31 is thus slidably supported by the shaft 35 and the housing structure. A roller or cam follower 40 carried by bar 31 rides in the cam slot 37 to effect sliding movement of the contact bar, as will be explained presently. The portion of the contact bar which cooperates with contacts 34 comprises an axially extending screw shank 41, an insulating sleeve or bushing 33 carried by the screw shank and constituting the insulating segment above-mentioned, a conductive collar 32 surrounding a portion of the insulating sleeve and constituting the conductive segment above mentioned, and a nut 44 holding the parts together. There are thus provided adjacent annular conductive and insulating surfaces which are engageable by the spring fingers 34. When the cam follower 40 is in the circular portion of the cam slot 37, one of the spring fingers 34 engages the conductive collar 32 while the other finger engages the insulating surface, as shown in Fig. 7. For all positions of the switch arm 29 other than the position in which it engages contact 26, the parts are thus disposed and the electrical connection between the spring contacts 34 is broken, thus rendering the switch 24 ineffective. As may be seen in Fig. 7, when the shaft 35 is rotated so as to bring switch arm 29 into engagement with contact 26, the cam follower 40 rides into the portion 45 of slot 37, thus causing the bar 31 to move toward the left, bringing both spring fingers 34 into engagement with the conductive collar 32. The switch 24 is thus rendered effective as above described.

It will be apparent, of course, that the interlock between switches 24 and 25 may take any suitable form and is not limited to the specific structure shown. For example, the interlock between the two switches could be in the form of a mechanical interlocking device rather than an electrical device, but by employing an electrical interlock the switches may be located remotely with respect to one another. It will be understood also that the switches 24 and 25 may take any suitable form, the forms illustrated being chosen merely for the sake of disclosure.

From the above description, it will be apparent that the invention provides a novel hot plate device which adequately fulfills the need for some means by which an electric roaster and a hot plate device may be operated simultaneously from the same electrical outlet without exceeding the permissible energy output of the outlet, while at the same time, the novel hot plate device is capable of varying uses by itself and may be utilized to perform various cooking operations requiring different amounts of heat. It will be understood, of course, that the invention is not limited to the specific devices disclosed and described herein nor is it limited to the specific values herein given. Obviously, the design of the several heating units may be varied while still adhering to the principles of the invention.

I claim:

1. In electrical cooking apparatus, a first electrical heating unit of predetermined energy-consuming capacity, a second electrical heating unit of predetermined energy-consuming capacity, means for selectively energizing said units from a single energy source, the total normal energy consumption of both of said units being in excess of the maximum permissible energy output of said source, an impedance element of relatively low energy-consuming capacity, and means for connecting said first unit in one parallel branch circuit and for serially connecting said second unit and said impedance element in another parallel branch circuit, whereby both of said units may be energized simultaneously, said impedance element being constructed and arranged to maintain the total energy consumption of said units within the maximum permissible energy output of the supply source.

2. In electrical cooking apparatus, a first electrical heating unit of predetermined energy-consuming capacity, a second electrical heating unit of predetermined energy-consuming capacity, switching means for selectively energizing said units from a single energy source, the total normal energy consumption of both of said units being in excess of the maximum permissible energy output of said source, an impedance element of relatively low energy-consuming capacity, and switching means for connecting said first unit in one parallel branch circuit and for serially connecting said second unit and said impedance element in another parallel branch circuit when said first unit is energized, whereby both of said units may be energized simultaneously, said impedance element being constructed and arranged to maintain the total energy consumption of said units within the maximum permissible energy output of the supply source.

3. In an electrical hot plate device, a first electrical heating unit of relatively high energy-consuming capacity, supply conductors connected to said heating unit, a second electrical heating unit also of high energy-consuming capacity, supply conducttors connected to said second heating unit, means for connecting the supply conductors of either of said units to a source of energy, whereby either of said units may be energized individually from a single energy source and two different heats or temperature levels may be obtained, the total normal energy consumption of both of said units being in excess of the maximum permissible energy output of said source, a pair of conductors connected respectively to the extremities of said first heating unit, a third electrical heating unit of relatively low energy-consuming capacity serially connected in one of said last-mentioned conductors, and means for connecting said last-mentioned conductors at will to the extremities of said second heating unit, whereby both of said high capacity heating units may be energized simultaneously and a third heat or temperature level may be obtained, the said low capacity unit being constructed and arranged to maintain the total energy consumption within the maximum permissible energy output of the supply source.

4. In an electrical hot plate device, a first electrical heating unit of relatively high energy-consuming capacity, a first set of terminal connectors, means connecting the extremities of said heating unit to said terminal connectors, a second electrical heating unit also of high energy-consuming capacity, a second set of terminal connectors, means connecting the extremities of said second unit to said second terminal connectors, whereby either of said heating units may be energized individually from a single source by means of a single connector cord connectable to either of said sets of terminal connectors, to thus obtain two different heats or temperature levels, the total normal energy consumption of both of said units being in excess of the maximum permissible energy output of said source, a pair of conductors connected respectively to the extremities of said first heating unit, a third electrical heating unit of relatively low energy-consuming capacity serially connected in one of said conductors, and a connector attached to said conductors for connecting the same at will to said second set of terminal connectors, whereby both of said high capacity heating units may be energized simultaneously and a third heat or temperature level may be obtained, the said low capacity unit being constructed and arranged to maintain the total energy consumption within the maximum permissible energy output of the supply source.

5. In electrical cooking apparatus, an electric roaster having a heating unit of relatively high energy consuming capacity, an electric hot plate having a heating unit also of relatively high energy-consuming capacity, means for selectively energizing said units from a single energy source, the total normal energy consumption of both of said units being in excess of the maximum permissible energy output of said source, a pair of conductors connected to the extremities of the heating unit of said hot plate, an impedance element of relatively low energy-consuming capacity disposed on said hot plate and serially connected in one of said conductors, and means for connecting said conductors to the extremities of the heating unit of said roaster at will whenever the heating unit of said hot plate is connected to said source, whereby said roaster and said hot plate may be energized simultaneously, the said impedance element being constructed and arranged to maintain the total energy consumption of said units within the maximum permissible energy output of the supply source.

JOSEPH W. MYERS.